United States Patent [19]

Short

[11] Patent Number: 4,809,805
[45] Date of Patent: Mar. 7, 1989

[54] ARTICULATED VEHICLE

[76] Inventor: James H. Short, 939 Pleasant View Dr., Des Moines, Iowa 50315

[21] Appl. No.: 167,555

[22] Filed: Mar. 14, 1988

[51] Int. Cl.⁴ .............................................. B62D 5/10
[52] U.S. Cl. .................................. 180/139; 180/134; 280/426; 280/468; 56/13.6
[58] Field of Search ...................... 180/134, 136, 139; 280/468, 426; 56/13.6, 13.7, 16.2

[56] References Cited

U.S. PATENT DOCUMENTS

| | | | |
|---|---|---|---|
| 3,357,513 | 12/1967 | Sundberg | 180/139 |
| 3,360,925 | 1/1968 | Zimmerman | 180/139 |
| 3,521,720 | 7/1970 | Korotkin | 180/136 |
| 4,111,273 | 9/1978 | Blackburn et al. | 180/139 |
| 4,538,400 | 9/1985 | Hottes | 56/13.6 |

Primary Examiner—Charles A. Marmor
Assistant Examiner—Donn McGiehan
Attorney, Agent, or Firm—Zarley, McKee, Thomte, Voorhees & Sease

[57] ABSTRACT

The articulated vehicle of the present invention includes a front frame and a rear frame which are interconnected by a universal coupling joint which is capable of pivoting about a vertical axis and about a horizontal axis. Mower decks may be mounted on the vehicle and raised and lowered by hydraulic cylinders. Hydraulic cylinders are also used to cause articulated movement with respect to the front and rear frames about a vertical axis.

11 Claims, 3 Drawing Sheets

ARTICULATED VEHICLE

BACKGROUND OF THE INVENTION

This invention relates to an articulated vehicle and particularly to a vehicle for use over irregular terrain.

A primary object of the present invention is the provision of an improved articulated vehicle.

A further object of the present invention is the provision of an articulated vehicle which includes a front frame and a rear frame which are interconnected in such a manner that they can pivot with respect to one another about a vertical axis and also about a horizontal axis.

A further object of the present invention is the provision of an articulated vehicle which can pass over irregular terrain easily.

A further object of the present invention is the provision of an articulated vehicle which can be used to carry mowing machines for use in irregular terrain such as might be encountered on a golf course.

A further object of the present invention is the provision of an articulated vehicle which is completely controlled by hydraulics and which can be easily controlled from the operator's seat.

A further object of the present invention is the provision of an articulated vehicle which is economical to manufacture, durable in use and efficient in operation.

SUMMARY OF THE INVENTION

The articulated vehicle of the present invention includes a front frame having two wheels thereon and a rear frame having two additional wheels thereon. The front frame and the rear frame are interconnected by a coupling assembly which permits the front and rear frames to pivot about a vertical axis with respect to one another and which also permits the front and rear frames to pivot about an axis extending generally in the longitudinal direction of travel of the vehicle.

The articulation of the vehicle is accomplished by means of hydraulic cylinders each of which are connected at one end to the front frame of the vehicle and are connected at the opposite end to the coupling member between the front and rear frames of the vehicle. By extending and retracting the cylinders it is possible to cause the vehicle to be articulated about its vertical axis so as to permit the vehicle to turn.

One important feature of the present invention is the geometric arrangement of the front wheels with respect to the vertical pivotal axis of the vehicle and the rear wheels with respect to the vertical axis of the vehicle. The front and rear wheels are both equidistant from the vertical axis so that when the vehicle is articulated to turn a corner the rear wheels track in the same path as do the front wheels. This is a particularly helpful feature when the device is used for mowing because it is possible to steer the device closely adjacent to curbed surfaces with the rear wheels following exactly the same path as the front wheels.

Mower decks may be mounted on opposite sides of the vehicle and beneath the vehicle so as to provide a very wide cutting swath when the vehicle is used for mowing such as on a golf course. The mower decks are mounted on arms which are pivotal with respect to the vehicle and which are controlled by hydraulic cylinders which permit the raising and lowering of the arms.

The operator rides on a platform on the front frame of the vehicle and has at his disposal a plurality of controls which control the articulated movement of the vehicle, the rotation of the wheels of the vehicle, the rotation of the cutting blades on the mower decks, and the raising and lowering of the mower decks with respect to the vehicle.

The rear frame of the vehicle is used to support an internal combustion engine which drives a hydraulic pump. The hydraulic pump is connected in an extensive hydraulic circuit for controlling all the various power means in vehicle. Thus, the vehicle is powered entirely by hydraulics.

DETAILED DESCRIPTION OF THE PREFERRED EMBODIMENT

Figure 2:
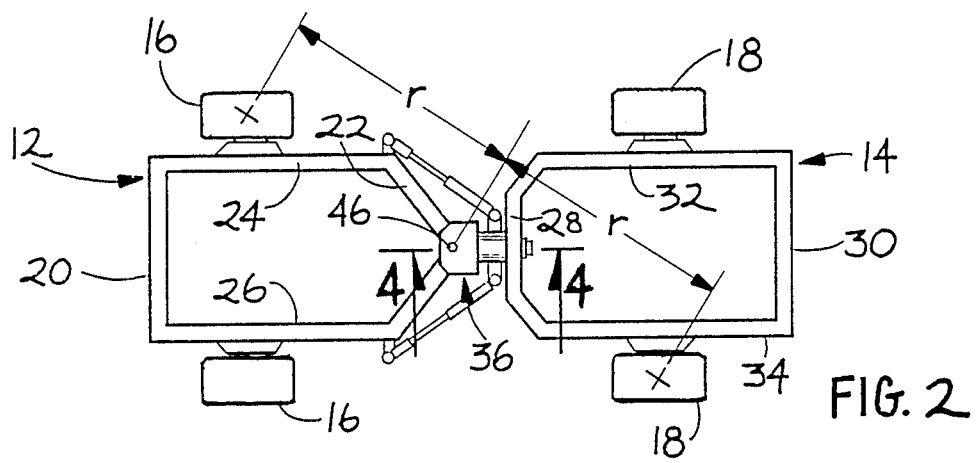
FIG. 2 is a top plan view of the vehicle showing the arrangement of the vehicle frame and wheel supports.

Referring to the drawings, the numeral 10 generally designates the vehicle of the present invention. Vehicle 10 comprises a front vehicle frame 12 and a rear vehicle frame 14 which are supported by front wheels 16 and rear wheels 18, respectively. Referring to FIG. 2, front frame 12 comprises a front frame member 20, a v-shaped rear frame member 22, and two opposite side members 24, 26. Rear frame 14 comprises a front frame member 28, a rear frame member 30, and two opposite side frame members 32, 34.

Figure 4:
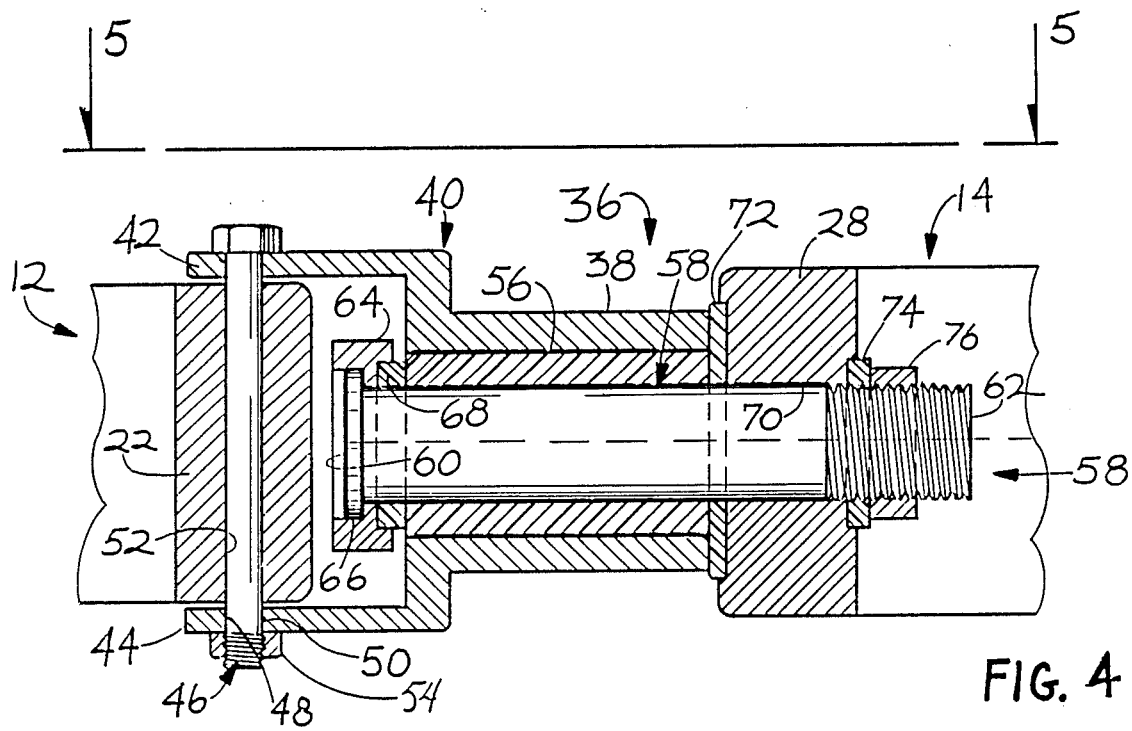
FIG. 4 is a sectional view taken along line 4—4 of FIG. 2.
Figure 5:
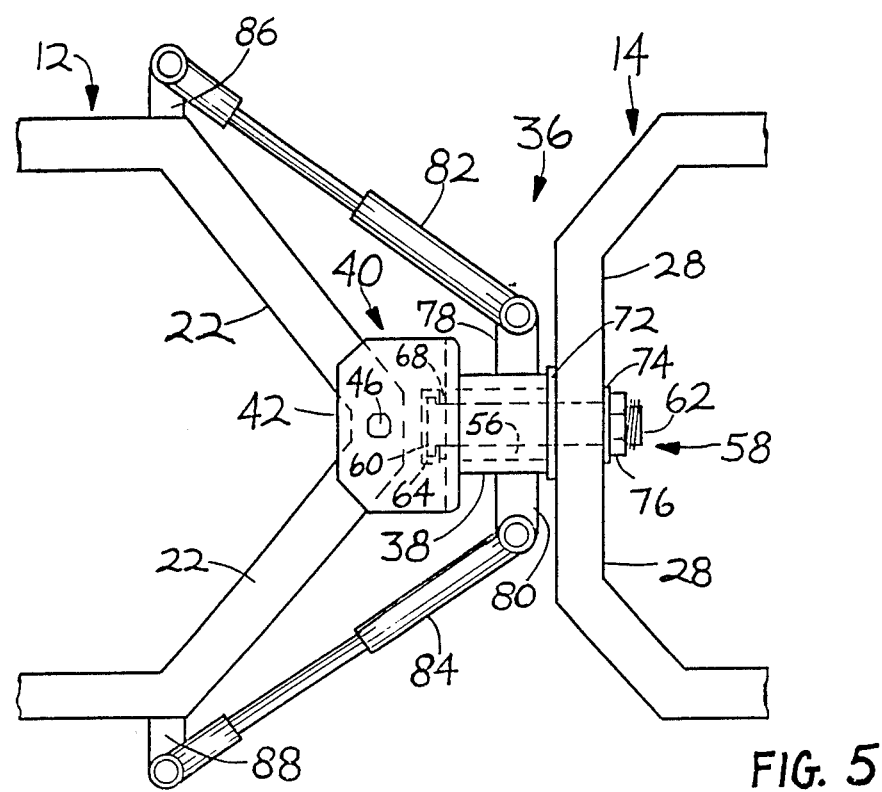
FIG. 5 is a plan view taken along line 5—5 of FIG. 4.

Interconnecting front frame member 12 and rear frame member 14 is a universal connecting assembly 36 which is shown in detail in FIGS. 4 and 5. Connecting assembly 36 includes a cylindrical collar 38 having a clevis 40 welded or otherwise fixed thereto. Clevis 40 includes an upper clevis member 42 and a lower clevis member 44. A vertical pivot pin 46 extends through aligned openings 48, 50 in clevis members 42, 44 and also extends through an elongated cylindrical bore 52 in v-shaped rear frame member 22. A locking nut 54 is threaded over the lower end of pin 46. Pin 46 provides a vertical pivotal axis between the rear frame member 22 of front frame 12 and the connecting assembly 36.

Cylindrical collar 38 of connecting assembly 36 includes a cylindrical Teflon bushing 56 mounted therein. Extending through Teflon bushing 56 is a horizontal pivot pin 58 having a head 60 at one end thereof and having a threaded end 62 at the opposite end thereof. A metal washer 64 also surrounds pin 58 and includes a counter bore 66 in which is seated the head 60 of pin 58. As can be seen from FIG. 4, head 60 is recessed axially within counter bore 66. A Teflon washer 68 also surrounds pin 58 and is positioned between metal washer 64 and Teflon bushing 56 so as to permit metal washer 64 to rotate with respect to bushing 56.

Pin 58 extends through a pin receiving opening 70 in the forward frame member 28 of rear frame 14. On opposite sides of front frame member 28 and surrounding pin 58 are a pair of Teflon washers 72, 74. Washer 72 permits collar 38 to rotate with respect to front frame member 28, and Teflon washer 74 prevents a nut 76 from frictionally engaging the rearward face of frame member 28. This arrangement provides for a free floating support of pin 58 so that pin 58 is free to rotate with respect to collar 38 and frame member 28. Similarly, collar 38 itself is free to rotate with respect to frame member 28. This provides for free pivotal movement of rear frame 14 with respect to front frame 12 about the horizontal pivotal axis provided by pin 58.

Figure 6:
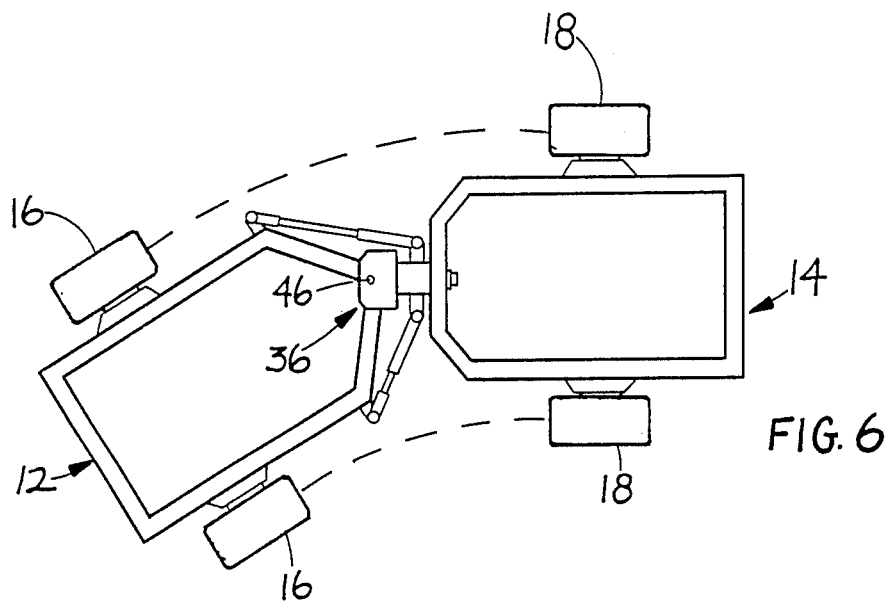
FIG. 6 is a top plan view similar to FIG. 2, and showing the path of the wheels when the vehicle is articulated.

Referring to FIG. 5, a pair of ears 78, 80 are welded or otherwise fixed to the outer surface of collar 38 on opposite sides thereof. A pair of hydraulic cylinders 82, 84 are each pivotally connected at one end to ears 78, 80, respectively, and at the opposite ends to ears 86, 88 on the v-shaped sides of front frame member 22 of front frame 12. Extension of piston 82 and retraction of piston 84 causes pivotal movement of front frame 12 with respect to universal connecting assembly 36 about the vertical axis provided by vertical pivot pin 46. This results in front frame 12 pivoting about axis 46 with respect to rear frame 14. As can be seen in FIG. 2, the distance r between the vertical pivot axis 46 and the rear wheels 18 is the same as the distance r between the pivot axis 46 and the front wheels 16. This is an important geometric relationship because when vehicle 10 turns as is illustrated in FIG. 6, the paths of the rear wheels 18 follow exactly the tracks made by front wheels 16. This prevents the rear wheels 18 from short cutting across any corner turned by the vehicle.

When the vehicle encounters irregular terrain it is also possible for front frame 12 to pivot about a horizontal axis with respect to rear frame 14, this horizontal axis being provided by the longitudinal axis of pin 60. Thus, a universal articulation of movement is permitted between front frame 12 and rear frame 14.

Figure 3:
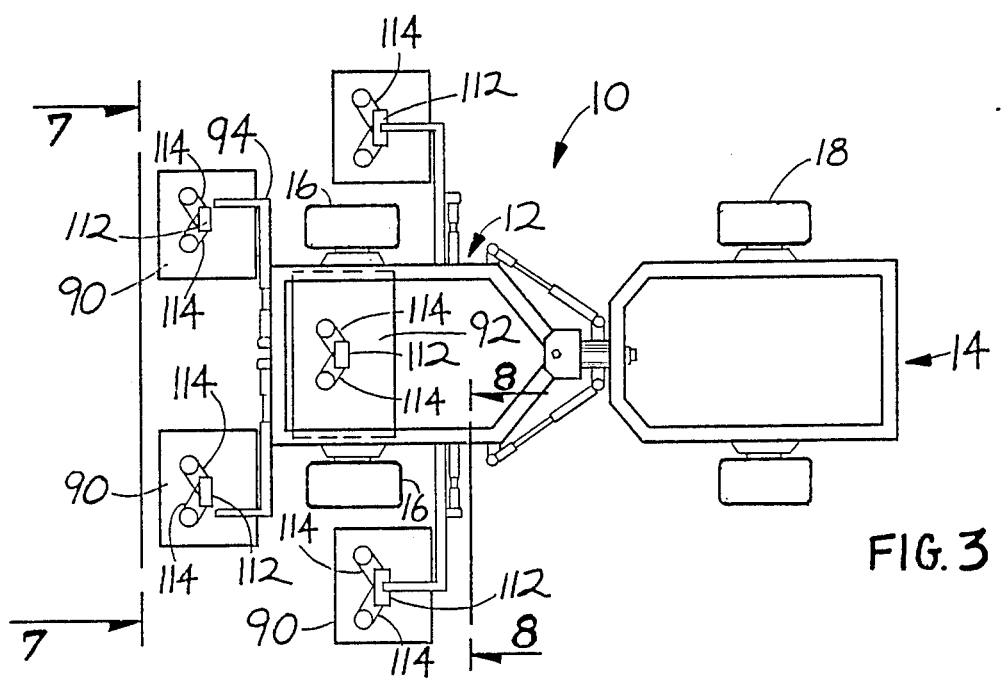
FIG. 3 is a top plan view similar to FIG. 2, but showing the arrangement of plurality of mowing decks on the vehicle.
Figure 7:
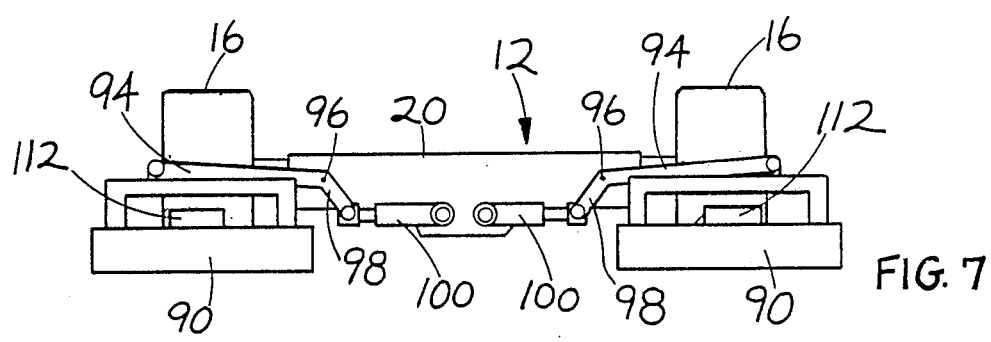
FIG. 7 is a detail view taken along line 7—7 of FIG. 3.

Referring to FIG. 3, the vehicle 10 can be used to support a plurality of mower decks 90 and a under carriage mower deck 92. FIG. 7 illustrates the support for the front mower decks 90 which are supported by arms 94 which are pivoted at 96 and which include a downwardly extending lever arm 98. Connected to the end of lever arm 98 and to the front frame member 20 of front frame 12 are hydraulic cylinders 100 which can be used to raise and lower the decks 90 about horizontal axis 96.

Figure 8:
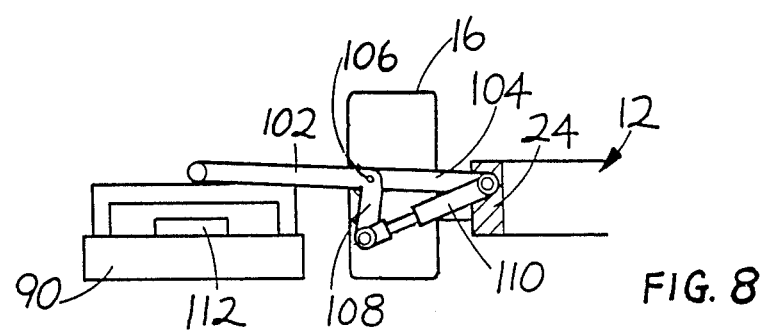
FIG. 8 is a detail view taken along line 8—8 of FIG. 3.

Referring to FIG. 8, the rear mower decks 90 are supported by horizontally extending arms 102 which are pivoted to a stub bar 104 about an axis 106. Stub bar 104 is welded or otherwise secured to side frame member 24 of front frame 12. Arms 102 include a lever portion 108 which is connected to a hydraulic cylinder 110 which in turn is connected to stub bar 104 for causing the raising and lowering of arms 102 and mower decks 90.

Each mower deck 90 includes a hydraulic motor 112 thereon and deck 92 includes a similar motor 112 thereon. Motors 112 are connected by belts 114 to mower blades (not shown) located on the under surfaces of decks 90.

Figure 1:
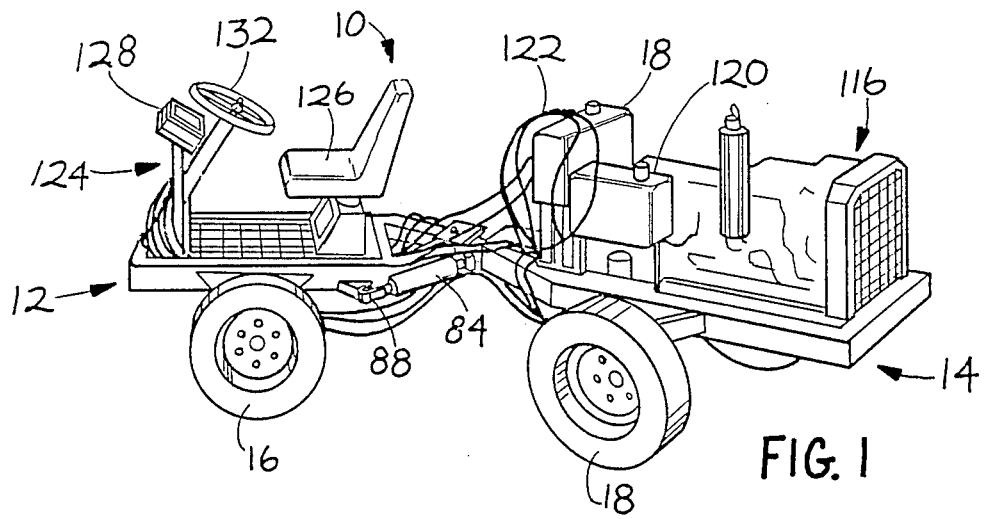
FIG. 1 is a perspective view of the vehicle of the present invention.

Referring to FIG. 1, rear frame 14 supports an internal combustion engine 116, a hydraulic reservoir 118 and a fuel tank 120. A hydraulic pump (not shown) is driven by engine 116 and is connected by a plurality of hydraulic hoses 122 to a control station 124 on front frame 12. Also mounted on front frame 12 is an operator's seat 126. A control box 128 includes switches (not shown) for controlling the raising and lowering and the operating of mower decks 90. A foot pedal 130 controls hydraulic motors located at the two wheels 16 for driving them to move the vehicle. A steering control 132 operates the hydraulic cylinders 82, 84 for causing the pivotal movement of front frame 12 with respect to rear frame 14. Thus, it can be seen that all of the mower decks 90, the hydraulic motors 112 thereon, the front wheels 16, the hydraulic cylinders 82, 84, and the cylinders 100, 110, are all hydraulically operated and are driven by the hydraulic pump which in turn is driven by the engine 116. Thus, it can be seen that the device accomplishes at least all of its stated objectives.

What is claimed:

1. An articulated vehicle comprising:
   a forward frame having a forward end, a rearward end, and opposite sides;
   a pair of spaced apart front wheels rotatably mounted to said forward frame for rotation about a front wheel axis extending between said opposite sides of said forward frame;
   a rear frame having a forward end, a rearward end, and opposite sides;
   a pair of spaced apart rear wheels rotatably mounted to said rear frame of rotation about a rear wheel axis extending between said opposite sides of said rear frame;
   universal connecting means connecting said rear end of said forward frame to said forward end of said rear frame, said connecting means having a longitudinal axis extending from said forward frame rearwardly toward said rearward frame, said connecting means being pivotally connected to one of said front and rear frames for pivotal movement about a vertical axis with respect thereto; said connecting means also permitting said forward and rearward frames to pivot with respect to one another about a second axis extending in the same general direction as said longitudinal axis of said connecting means;
   first power means for rotatably driving at least two of said front and rear wheels;
   second power means connected to said connecting means and to said one of said front and rear frames for causing rotation of said one of said front and rear frames to rotate about said vertical axis; and
   control means connected to said first and second power means for controlling said first and second power means;
   said second power means comprising at least one hydraulic cylinder having a reciprocating piston rod therein, one of said cylinder and said piston rod being connected to said front frame and the other of said cylinder and said piston rod being connected to said connecting means whereby extension and retraction of said piston rod within said cylinder causes articulated movement of said forward frame and said rearward frame about said vertical axis;
   said connecting means comprising a cylindrical collar having a clevis fixed thereto, a horizontal pivot pin extending through said cylindrical collar and through said forward end of said rear frame to provide said second axis, and a vertical pin extending through said clevis and said front frame to provide said vertical axis.

2. A vehicle according to claim 1 wherein said control means comprises a steering control means on one of said front and rear frames, said steering control means being connected to said second power means for actuating said second power means to cause said forward frame and said rearward frame to pivot with respect to one another about said vertical axis.

3. A vehicle according to claim 1 wherein said vertical axis is located equidistant from each of said front and rear pairs of wheels whereby said rear wheels will follow substantially the same paths of said front wheels regardless of the angle of articulation of said forward and rear frames with respect to each other about said vertical axis.

4. A vehicle according to claim 1 wherein said horizontal pivot pin is free floating and capable of rotating along its longitudinal axis with respect to both said collar and said forward end of said rear frame.

5. A vehicle according to claim 4 wherein said collar includes coupling means thereon for pivotally connecting said piston and rod to said collar for pivotal movement with respect thereto about a vertical coupling axis.

6. A vehicle according to claim 1 wherein both of said first and second power means comprise hydraulic power means.

7. A vehicle according to claim 6 wherein said control means is mounted on said forward frame and includes a foot pedal control means hydraulically connected to said first power means for controlling the speed at which said first power means drives said wheels, and a steering control means for controlling said second power means.

8. A vehicle according to claim 7 wherein an operator seat is on said and frame and an engine is on said rear frame, a hydraulic pump driven by said engine, hydraulic circuitory interconnecting said hydraulic pump, said control means and said first and second power means.

9. A vehicle according to claim 8 and further comprising a plurality of mower decks, hinge means connecting each of said mower decks to said forward frame for hinged movement with respect thereto.

10. A vehicle according to claim 9 wherein a hydraulic motor means is mounted to each of said mower decks and a hydraulic deck cylinder is connected to each of said mower decks and to said forward frame for causing hinged movement of said decks with respect to said forward frame.

11. A vehicle according to claim 10 wherein said control means further comprises a plurality of deck motor controls and a plurality of deck cylinder controls, said hydraulic circuitry connecting each of said deck motor controls to one of said deck motors and each of said deck cylinder controls to one of said deck cylinders.

* * * * *